United States Patent
Yitzhaky et al.

(10) Patent No.: US 8,249,357 B2
(45) Date of Patent: Aug. 21, 2012

(54) BLIND RESTORATION OF IMAGES DEGRADED BY ISOTROPIC BLUR

(75) Inventors: Yitzhak Yitzhaky, Beer Sheva (IL); Omri Shacham, Mitzpe Ramon (IL); Oren Haik, Beer-Sheva (IL)

(73) Assignee: Ben Gurion University of the Negev, Research and Development Authority, Beer-Sheva (IL)

( * ) Notice: Subject to any disclaimer, the term of this patent is extended or adjusted under 35 U.S.C. 154(b) by 407 days.

(21) Appl. No.: 12/446,790

(22) PCT Filed: Oct. 22, 2007

(86) PCT No.: PCT/IL2007/001264
§ 371 (c)(1),
(2), (4) Date: Nov. 29, 2009

(87) PCT Pub. No.: WO2008/050320
PCT Pub. Date: May 2, 2008

(65) Prior Publication Data
US 2010/0080487 A1    Apr. 1, 2010

Related U.S. Application Data

(60) Provisional application No. 60/853,471, filed on Oct. 23, 2006.

(51) Int. Cl.
*G06K 9/48* (2006.01)

(52) U.S. Cl. ........ 382/199; 382/194; 382/195; 382/196; 382/197; 382/198; 382/242; 382/266; 382/275

(58) Field of Classification Search .......... 382/194–199, 382/242, 266, 275
See application file for complete search history.

(56) References Cited

U.S. PATENT DOCUMENTS

| | | | |
|---|---|---|---|
| 5,790,709 A * | 8/1998 | Kopeika et al. | 382/254 |
| 5,841,911 A | 11/1998 | Kopeika | |
| 5,912,993 A * | 6/1999 | Puetter et al. | 382/275 |
| 5,960,058 A * | 9/1999 | Baba et al. | 378/98.4 |
| 6,154,574 A * | 11/2000 | Paik et al. | 382/255 |
| 6,859,564 B2 | 2/2005 | Caron | |
| 7,162,100 B1 | 1/2007 | Gregory | |
| 7,499,600 B2 | 3/2009 | Ojanen et al. | |
| 7,590,306 B2 | 9/2009 | Lal et al. | |
| 7,783,440 B1 * | 8/2010 | Lewis et al. | 702/77 |

(Continued)

FOREIGN PATENT DOCUMENTS
WO    2007001264    1/2007

OTHER PUBLICATIONS

Acceleration—algorithms, Biggs et al. Applied optics, vol. 36, No. 8, Mar. 10, 1997, pp. 1766-1775.*

(Continued)

*Primary Examiner* — Jayesh A Patel
(74) *Attorney, Agent, or Firm* — Graeser Associates International Inc; Dvorah Graeser

(57) ABSTRACT

A system and a method for automatic restoration of isotropic degradations of a digital image, based on receiving a blurred image by an image capture assembly, automatically finding proper step edge, calculating the PSF from the step edge, and restoring the blurred image by means of a processor, and with the option to display the resorted image by means of an output assembly.

13 Claims, 13 Drawing Sheets

U.S. PATENT DOCUMENTS

| | | | |
|---|---|---|---|
| 7,860,336 B2* | 12/2010 | Bando | 382/261 |
| 7,881,551 B2* | 2/2011 | Paik et al. | 382/260 |
| 8,139,886 B2* | 3/2012 | Szeliski et al. | 382/260 |
| 2004/0066981 A1* | 4/2004 | Li et al. | 382/286 |
| 2004/0190030 A1* | 9/2004 | Foster et al. | 358/1.9 |
| 2005/0111760 A1* | 5/2005 | Lal et al. | 382/298 |
| 2005/0254041 A1* | 11/2005 | Sadoulet et al. | 356/124 |
| 2005/0276513 A1* | 12/2005 | Ojanen et al. | 382/286 |
| 2007/0031057 A1* | 2/2007 | Woo et al. | 382/255 |

OTHER PUBLICATIONS

Effects—atmosphere, Haik et al., SPIE 0091-3286, 2006, pp. 117006-1 to 117006-8.*

PSF estimation—deblurring, Bernard Chalmond, Academic press, 1049-9652, 1991, pp. 364-372.*

PSF estimation—ESF, Elisa H. Barney Smith.Society of Photo-optical—Engg, Jan. 17, 2006, pp. 1-10.*

A computational—detection,John Canny, IEEE, 0162-8828, 1986, pp. 679-698.*

A method—selection, Yitzhaky et al., IEEE, 0162-8828, 2003,pp. 1027-1033.*

Effect—edge, Hon-Sum Wong, Optical engg, Sep. 1991 vol. 30 No. 9, pp. 1394-1398.*

Characterizing—devices, Reichenbach et al., Optical engg, vol. 30 No. 2, Feb. 1991, pp. 170-177.*

Automatic—measures, Koren et al., Elsevier, 1077-3142, 2006, pp. 205-213.*

PCT Search Report for corresponding PCT application PCT/IL2007/001264, transmitted on Aug. 25, 2008.

PCT Written Opinion for corresponding PCT application PCT/IL2007/001264.

Kundur, D., Hatzinakos, D., Blind image deconvolution, IEEE Signal Processing Mag. 13, 43-64, (1996).

Carasso, A., Direct blind deconvolution, Siam Journal of Applied Math 61(6), 1980-2007, (2001).

Chalmond, B., PSF estimation for image deblurring, Graphical models and Image Processing 53(4), 364-372, (1991).

Yitzhaky, Y., Milberg, R., Yohayev, S., Kopeika, N. S., Comparison of direct blind deconvolution methods for motion-blurred images, Appl. Opt. 38(20), 4325-4332, (1999).

Nishi, K., Ando, S., Blind superresolving image recovery from blur invariant edges, Proc. of Int. Conf. Acoustics, Speech, Signal Processing. vol. 5. Adelaide, Australia, pp. 85-88, (1994).

Pavlovic, G., Tekalp, A. M., Maximum Likelihood Parametric Blur Identification Based on a Continuous Spatial Domain Model, IEEE Trans. Image Process. 1(4), 496-504, (1992).

Savakis, A. E., Trussell, H. J., Blur identification by residual spectral matching. IEEE Trans, Image Process. 2(2), 141-151, (1993).

Sheppard, D. G., Bobby, H., Michael, M., Iterative multi-frame superresolution algorithms for atmospheric-turbulence-degraded imagery, J. Opt. Soc. America. A. 15(4), 978-992, (1998).

Li, D., Merserau, R. M., Blur identification based on kurtosis minimization. In: Proc, IEEE International Conference on Image Processing (ICIP). vol. 1. Genova, Italy, pp. 905-908, Sep. (2005).

Barney-Smith, E. H., PSF estimation by gradient descent fit to the ESF, Proc. SPIE Electronic Imaging, Image Quality and System Performance III. vol. 6059. San Jose, CA., Jan. 2006.

Dror, I., Kopeika, N. S, Experimental comparison of turbulence MTF and aerosol MTF through the open atmosphere, J. Opt. Soc. Am. A 12(5), 970-980, (1995).

Haik, O., Lior, Y., Nahmani, D., Yitzhaky, Y., Effectes of image restoration on acquisition of moving obects from thermal video sequences degaded by the atmosphere, Opt. Eng. 45, 117006, (2006).

Reichenbach, S. E., Characterization digital image acquisition, Opt. Eng. 30(2), 170-177, (1991).

Wong, H., Effect of Knife-Edge skew on modulation transfer function measurements of charge coupled device imagers employing a scanning Knife-Edge, Opt. Eng. 30(9), 1394-1398, (1991).

Yitzhaky, Y., Dror, I., Kopeika, N. S., Restoration of atmosphericalblurred images according to weather-predicted atmospheric modulation transfer function (MTF), Opt. Eng. 36(11), 3064-3072, (1997).

Canny, J.F., A Computational Approach to Edge Detection. IEEE Trans, Pattern Anal. Mach. Intell. 8(6), 679-698, (1986).

Koren, R., Yitzhaky, Y., Automatic selection of edge detector 20 parameters based on spatial and statistical measures, Computer Vision and Image Understanding 102(2), 204-213, (2006).

Yitzhaky, Y., Peli, E., A method for objective edge detection evaluation and detector parameter selection, IEEE Trans. Pattern Analysis & Machine Intelligence 25(8),1027-1033, (2003).

Darlington, R. B., Is kurtosis really peakedness?, American Statistician 24, Apr. 19-22, 1970.

Yitzhaky Yitzhak Home Page at Ben-Gurion University, Israel [web page], URL [Accessed May 5, 2007]: http://www.ee.bgu.ac.il/~itzik/BestStep/ with article from 2007 in Pattern Recognition Letters, 2007, entitled Blind restoration of atmospherically degraded images by automatic best step detection, by Shacham et al.

CONTROP precision technologies LTD. URL [Accessed Nov. 21, 2006]: http://www.controp.co.il.

Biggs, D. S. C., Andrews, M., Acceleration of iterative image restoration algorithms, Appl. Opt. 36(8), 1766-1775, (1997).

Loyev, V., Yitzhaky, Y., Initialization of iterative parametric algorithms for blind deconvolution of motion-blurred images, Appl. Opt. 45(11), 2444-2452, (2006).

* cited by examiner

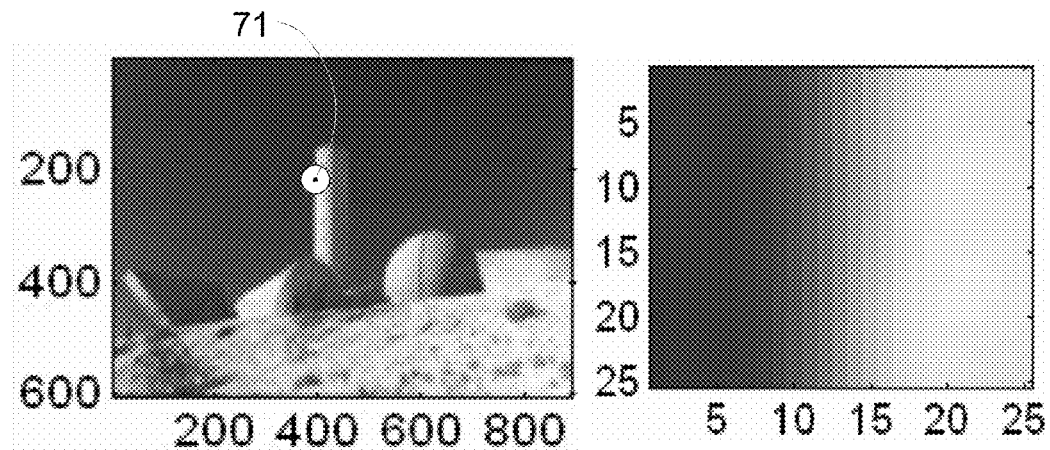
FIG. 17a  FIG. 17b
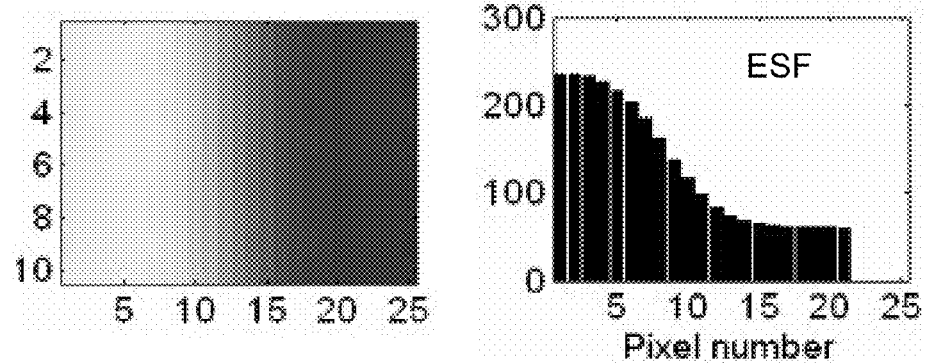
FIG. 17c  FIG. 17d
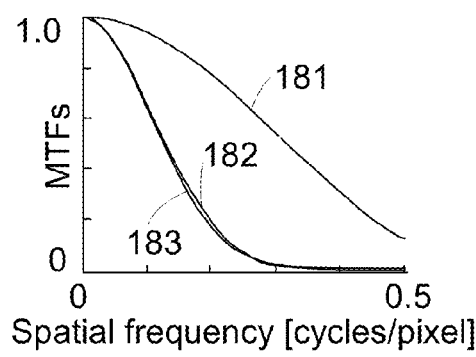 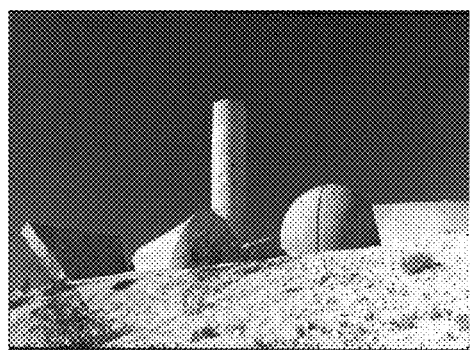
FIG. 18a  FIG. 18b

BLIND RESTORATION OF IMAGES DEGRADED BY ISOTROPIC BLUR

CROSS-REFERENCE TO RELATED APPLICATIONS

This application is the U.S. national phase application of PCT International Application No. PCT/IL2007/001264, filed on Oct. 22, 2007, which claims the benefit of U.S. Provision Application Ser. No. 60/853,471 filed Oct. 23, 2006, both of which are hereby incorporated by reference in their entirety.

FIELD OF THE INVENTION

The present invention relates to restoration of a blurred digital image and, in particular to automatic restoration of a digital image distorted by isotropic degradations.

BACKGROUND OF THE INVENTION

Image restoration algorithms often require previous knowledge about the point spread function (PSF) of the disturbance.

Some good examples of the term PSF follow in the illustrations of the present patent application and their accompanying explanations.

Deriving the PSF manually from a degraded ideal step-edge in the image is a well known procedure intended mainly for isotropic degradations. A common image degradation that can be approximated as isotropic is the atmospheric blurring in long distance imaging.

U.S. Pat. No. 7,162,100, "Methods for image enhancement", of Gregory, discloses an improvement on a known method, Richardson Lucy (RL) deconvolution for restoration of blurred images, by means of an algorithm including several iterations. The patent teaches a method of restoring the image on the assumption of a known PSF; however has a major disadvantage in not teaching how to estimate the PSF solely (and automatically) from the data available in the image.

U.S. Pat. No. 5,841,911, "Method for the restoration of images disturbed by the atmosphere", of Kopeika et al., discloses a method including direct blind deconvolution, however one of the disadvantages of this method is that it is not general, and finding the atmospheric modulation transfer function (MTF) is done according to weather data, requiring a meteorological station alongside the imaging system.

U.S. Pat. No. 6,859,564 "Signal processing using the self de-convolving data reconstruction algorithm", of Caron discloses the description of an automatic method for the improvement of images subject to blur, however one of its major disadvantages is assumption that PSF depends on the smoothed magnitude of the true image, while in fact, the PSF characterizes degradation causes which are unrelated to the true image, as the same true image can be blurred by many different PSF types.

The present invention may be better understood with reference to the following scientific papers:

1. Kopeika, N. S., *A System Engineering Approach to Imaging*, second ed. SPIE Optical Engineering Press, Bellingham, Wash., (1998).
2. Jalobeanu, A., Zerubia, J., Blanc-Feraud, L., *Bayesian estimation of blur and noise in remote sensing imaging*, Campisi, P., Egiazarian, K. (Eds.), Blind image deconvolution: theory and applications. Taylor & Francis/CRC press, May, (2007).
3. Kundur, D., Hatzinakos, D., *Blind image deconvolution*, IEEE Signal Processing Mag. 13, 43-64, (1996).
4. Carasso, A., *Direct blind deconvolution*, SIAM Journal of Applied Math 61(6), 1980-2007, (2001).
5. Chalmond, B., *PSF estimation for image deblurring*, Graphical models and Image Processing 53(4), 364-372, (1991).
6. Yitzhaky, Y., Milberg, R., Yohayev, S., Kopeika, N. S., *Comparison of direct blind deconvolution methods for motion-blurred images*, Appl. Opt. 38(20), 4325-4332, (1999).
7. Nishi, K., Ando, S., *Blind superresolving image recovery from blur invariant edges*, Proc. of Int. Conf. Acoustics, Speech, Signal Processing. Vol. 5. Adelaide, Australia, pp. 85-88, (1994).
8. Pavlovic, G., Tekalp, A. M., *Maximum Likelihood Parametric Blur Identification Based on a Continuous Spatial Domain Model*, IEEE Trans. Image Process. 1(4), 496-504, (1992).
9. Savakis, A. E., Trussell, H. J., *Blur identification by residual spectral matching*. IEEE Trans, Image Process. 2(2), 141-151, (1993).
10. Sheppard, D. G., Bobby, H., Michael, M., *Iterative multi-frame super-resolution algorithms for atmospheric-turbulence-degraded imagery*, J. Opt. Soc. America. A. 15(4), 978-992, (1998).
11. Li, D., Merserau, R. M., *Blur identification based on kurtosis minimization. In: Proc*, IEEE International Conference on Image Processing (ICIP). Vol. 1. Genova, Italy, pp. 905-908, September (2005).
12. Barney-Smith, E. H., *PSF estimation by gradient descent fit to the ESF*, Proc. SPIE Electronic Imaging, Image Quality and System Performance III. Vol. 6059. San Jose, Calif., January (2006).
13. Dror, I., Kopeika, N. S, *Experimental comparison of turbulence MTF and aerosol MTF through the open atmosphere*, J. Opt. Soc. Am. A 12(5), 970-980, (1995).
14. Haik, O., Lior, Y., Nahmani, D., Yitzhaky, Y., *Effects of image restoration on acquisition of moving objects from thermal video sequences degraded by the atmosphere*, Opt. Eng. 45, 117006, (2006).
15. Reichenbach, S. E., *Characterizing digital image acquisition*, Opt. Eng. 30(2), 170-177, (1991).
16. Wong, H., *Effect of Knife-Edge skew on modulation transfer function measurements of charge coupled device imagers employing a scanning Knife-Edge*, Opt. Eng. 30(9), 1394-1398, (1991).
17. Yitzhaky, Y., Dror, I., Kopeika, N. S., *Restoration of atmospherically-blurred images according to weather-predicted atmospheric modulation transfer function (MTF)*, Opt. Eng. 36(11), 3064-3072, (1997).
18. Canny, J. F., *A Computational Approach to Edge Detection. IEEE Trans*, Pattern Anal. Mach. Intell. 8(6), 679-698, (1986).
19. Jain, A. K., *Fundamentals of image processing*, Prentice Hall, Engle-wood Cliffs, N.J., (1989).
20. Koren, R., Yitzhaky, Y., *Automatic selection of edge detector parameters based on spatial and statistical measures*, Computer Vision and Image Understanding 102(2), 204-213, (2006).
21. Yitzhaky, Y., Peli, E., *A method for objective edge detection evaluation and detector parameter selection*, IEEE Trans. Pattern Analysis & Machine Intelligence 25(8), 1027-1033, (2003).
22. Darlington, R. B., *Is kurtosis really peakedness?*, American Statistician 24, 19-22, April, (1970).

23. Moors, J. J. A., *The meaning of kurtosis*, Darlington revisited, American Statistician 40, 283-284, (1986).

24. Palmer, A. R., Strobeck, C., *Fluctuating asymmetry analyses revisited*, Polak, M. (Ed.), Developmental instability: causes and consequences. Oxford University Press, New York, pp. 279-319, (2003).

25. Yitzhaky Yitzhak *Home Page at Ben-Gurion University, Israel* [web page], URL [Accessed 5 May 2007]: http://www.ee.bgu.ac.il/~itzik/BestStep/

26. CONTROP precision technologies LTD. URL [Accessed 21 November 2006]: http://www.controp.co.il 27. Biggs, D. S. C., Andrews, M., *Acceleration of iterative image restoration algorithms*, Appl. Opt. 36(8), 1766-1775, (1997).

28. Loyev, V., Yitzhaky, Y., *Initialization of iterative parametric algorithms for blind deconvolution of motion-blurred images*, Appl. Opt. 45(11), 2444-2452, (2006).

29. Oppenheim, A. V., Schafer, R. W., *Discrete-Time Signal Processing*, Prentice-Hall, Engle-wood Cliffs, N.J., pp. 447-448, (1989).

Which are incorporated by reference for all purposes as if fully set forth herein.

Note that the inventors of the present application have hardcopies of all references mentioned as web URLs with the intention of preserving them even in case that the publications are removed from the internet.

Remotely sensed images captured by high-resolution imagers are likely to be degraded by the atmosphere [1]. The degradation sources which include turbulence and aerosols in the atmosphere cause image blur, in addition to spatio-temporal movements and intensity scintillations.

A system approach for restoration of atmospherically blurred images models the blurred image as a convolution between the original image and the atmospheric PSF. In such a case, simple deconvolution techniques (such as Wiener filtering) can be used to restore the image [1]. However, the main difficulty is the need for a reliable knowledge of the PSF. The reason for this difficulty is that in most practical remote sensing situations this data is not known a-priori. Usually the only available data is the recorded image itself. An image deconvolution process in this case is called blind deconvolution or blind restoration.

There has been extensive work on blind deconvolution over the past twenty-one years, including survey articles [2, 3]. Existing blind de-convolution methods can be categorized into two main classes: methods which separate blur (PSF) identification as a disjoint procedure from restoration [4-6], and methods which combine blur identification and restoration in one procedure [7-10]. Methods in the first class tend to be computationally simpler. For example, Chalmond [5] proposed to isolate specific features in the image, such as sharp edge elements, and then to estimate the PSF from them, assuming radial symmetry. However, a main drawback of this method is the assumption that the shapes of all the extracted edges can be modeled as ideal step functions in the original (un-blurred) image. No criterion is employed to evaluate the best (closest to ideal) step-edge from the set of sharp edge elements in the degraded image.

Methods in the second class usually use iterative procedures to estimate the blur extent [2, 3, 7-10]. They often formulate parametric models for both the image and the blur, and in each step the image and the blur parameters are estimated and used in the next iteration. A Gaussian function is often used to approximate the atmospheric PSF [8-10]. A shortcoming of these methods is the requirement for a good initial guess of the PSF. The resulting accuracy of the estimated PSF (and consequently the quality of the restored images) depends on the accuracy of this initial guess. Also, the algorithm speed of convergence depends on this guess.

Recently, a blind deconvolution method based on kurtosis minimization has been proposed [11]. Using different choices for the blur parameters, the noisy blurred image is restored with a Wiener filter. Then, a statistical criterion (minimum kurtosis) is used as a measurement for the quality of the restored images. However, one of the disadvantages of this method is the requirement for a-priori knowledge of the blur parameter range for a reasonable computational load.

SUMMARY OF THE INVENTION

The background art does not teach or suggest an efficient method that automatically finds the appropriate step-edge from the degraded image and that can be used to an automatic (blind) image restoration The present invention overcomes these deficiencies of the background art by providing a system and a method which automatically finds the appropriate step-edge from the degraded image itself.

As used herein the specification and in the claims section that follows, the term "edge" and the like substantially refer to a location of a sharp transition between gray levels in the image, the term "sharp edge elements" and the like substantially refer to high contrast edges (edges across which the intensity varies considerably and rapidly), the term "step-edge detection" and the like substantially refer to locating long and straight sharp edge elements with homogenous areas in both of their sides (a step-function), the term "blind image restoration" and the like substantially refer to restoring images without a-priori knowledge of the PSF, the term "blur identification" and the like substantially refer to an estimation of the PSF (or MTF), and the term "atmospheric blur" and the like substantially refer to the atmospheric PSF (or MTF).

According to the present invention there is provided a system and an efficient method that automatically finds the appropriate (closest to ideal) step-edge from the degraded image.

As used herein the specification and in the claims section that follows, the term "appropriate step-edge" and the like substantially refer to a step-edge which is closest (as much as possible) to ideal.

The identified PSF is then used to restore the image. The existence of a good step-edge in the image may be assumed in cases such as imaging of urban areas. The criteria employed include the straightness and length of the edge, its strength, and the homogeneity of the steps in both sides of the edge. The search for the "appropriate step-edge" is carried out only along the edges detected in the image by a proper edge detection operation. The algorithm, according to the present invention is efficient, and the result is an automatic blind image restoration.

This method is particularly efficient for isotropic degradations.

Isotropic degradations of an image, can be caused by various factors such as being 'out of focus' and atmospheric blurring in long distance imaging.

Even though the phrasing of the present patent application refers mostly to atmospheric blurring as a cause of isotropic degradations, the system and method for automatic blind image restorations apply well to all isotropic degradations, regardless of the origin of the error.

According to the present invention, the estimation of the PSF is done directly from the blurred digital image itself, via automatic detection of the appropriate (closest to ideal) step-edge, and then using this information for the restoration of the atmospherically-degraded images. A good step-edge may exist in cases such as imaging of urban areas. Successful image restorations based on manual selection of such a step-edge were done earlier [12-17].

The method, according to the present invention, is not iterative. It assumes an isotropic PSF but does not require a known parametric form.

Following is a summary of the stages of the method according to the present invention:

The 'Appropriate Step-Edge Detection' Stage:

In horizontal long-distance imaging, the image of an ideal step-edge at the object plane will become a degraded version of it due to atmospheric effects.

Assuming a linear space-invariant degradation process, with isotropic statistical properties of the blur [1, 13, 15, 17], the derivative of a step-edge response (at any edge direction) is the line spread function (LSF), whose Fourier-transform magnitude is the Modulation Transfer Function (MTF) characterizing the blur, in the spatial frequency domain. The MTF may be employed in a filtering process (such as the Wiener filter) to obtain a restored (de-blurred) image. According to the present invention there is provided a method teaching how to find an appropriate step-edge automatically, consequently enabling automatic image restoration process.

Assuming an ideal step-edge exists in the object plane, a software search for a long high-contrast straight edge that is homogenous on both sides is performed. A long edge will allow averaging over a large area to reduce noise artifacts. A high-contrast edge is preferred because it yields a better Signal to Noise Ratio (SNR) in the LSF calculation process. Straight edges are sought for simplicity, and for being common and relatively reliable features for LSF extraction [13, 17]. Other object shapes may also be considered, but will require a more complex procedure. The edge should have homogenous areas in both sides (a step-edge) that are larger than the LSF size, to be considered as an appropriate step-edge.

The appropriate step-edge may exist at any location and orientation in the image. A heuristic search for it would be very tedious and not practical in applications where computation time is taken into consideration. Therefore, an efficient algorithm is provided, in which the number of possible solutions narrows considerably as the algorithm advances. The algorithm includes an edge detection operation at the first step, which reduces the number of examined pixels by an order of magnitude. Then, the straightness and the length of detected edges are evaluated. The appropriate edges obtained in this stage are then evaluated for having the properties of homogenous areas from both sides and high contrast, which characterize a step-edge. The appropriate, two-dimensional step-edge, obtained in this stage is then averaged for noise reduction and the atmospheric MTF is calculated from it. The extracted MTF is used for restoring the atmospherically degraded image. A detailed description of the method is presented below.

The 'Edge Detection' Stage:

A step-edge includes transition between two grey levels. Sharp grey-level transitions in the image can be located using an edge detection operation. The Canny edge detector [18] is a good option for the edge detection operation since it produces a single-line edge (one-pixel width) as a result of its non-maximal suppression stage, and it also provides relatively non-broken edges due to its hysteresis stage. Other edge detection operators that produce a single edge response such as this, using morphological thinning for instance [19], may alternatively be employed. An automatic selection of the edge detection parameters can be used [20]. However, the method, according to the present invention, is not very sensitive to the parameters of the edge detection because only the strongest edges which result from high-contrast large step-edges are usable here, and such edges are associated with a wide range of edge detection parameters [21].

The 'Evaluation of the Edge Length and Straightness' Stage:

Length and straightness evaluation of edges, which are as noted above lines of one-pixel width, is obtained here in two stages. In the first stage, these properties are evaluated for small regions around each pixel, such as 3×3 pixels, and in the second, the evaluation is extended for larger edge lengths.

The 'Small-Scale Evaluation' Stage:

First, edge pixels with more than two neighbors (eight-pixel connectivity), which characterize junctions and corners, are removed. Then, the remaining edge pixels are organized into separate chains which are groups of sequentially connected pixels.

Afterward, the angle of each pixel relative to its adjacent neighbors (similar to chain coding [19]) is calculated, producing chains of the local angle-weightings for the pixels in the contours obtained in the edge detection stage. These chains represent the straightness of a chain of pixels in a local sense (a 3×3 pixel area centered at the examined pixel in the chain of the edge pixels).

An additional consideration of the local weight of each pixel and an example of the term "neighbor" will be given later on, in the detailed description of embodiments.

The 'Large-Scale Evaluation' Stage:

In this stage, the code of small-scale length and straightness weighting (obtained previously) is arranged sequentially (as vectors), and then it is low-pass filtered (smoothed) to obtain larger scale information about the straightness of the chain of pixels. Higher values in the low-pass filtered code indicate higher length and straightness of the chain of pixels. Low-pass filtering is obtained here by a convolution with a rectangular kernel. Pixels with the highest values are selected for the next stage.

"A rectangular kernel" is a common term used in the field, and its use for filtering is a good option, however it is not the only option and filtering can be performed by other means, such as filtering with a Gaussian function.

A larger width of the smoothing kernel allows locating longer straight edges, and thus reducing the number of possible appropriate edges (improving computational complexity), but it should be small enough to allow sufficiently many edge-pixels to pass into the next stage. Therefore, a large spatial width may be selected when the expected number of long-straight edges is high. Another option is to start with a small kernel size, and then gradually increase it until a specified amount of pixels is passed into the next step. Since it was found that the method is not very sensitive to this parameter, it is preferred, for simplicity, to select it as equal to the length of the square region described in the next step.

The 'Contrast and Homogeneity of the Edge Sides' Stage:

After locating the appropriate long and straight edges, which of these edges has a high contrast and homogeneous regions from both sides (properties that characterize a step-edge) is examined. This is done by taking a square region surrounding the center pixel of the (two dimensional) edge and observing the histogram of the pixels in that area. The histogram of an ideal stepedge is constructed of only two grey levels, with a large distance apart, one of them represents the darker pixels and the other represents the brighter ones. In a blurred step-edge the histogram will take the shape of two hills (a bimodal distribution). The thinness of the hills and the relative number of pixels included in them indicate the closeness of the edge to an ideal one (homogeneous regions from both sides). The distance between the hills indicates the contrast of the edge. These properties can be efficiently evaluated from the histogram by calculating its variance. A higher variance indicates a better step-edge. However, the variance may give excessive importance to the contrast of the edge. In order to increase the weight of the bi-modality property, kurtosis is also used, defined as the ratio between the fourth central moment and the square of the second central moment [11,12]:

$$\frac{E\{(x_s - \mu)^4\}}{E\{(x_s - \mu)^2\}^2}, \qquad \text{Eq. (1)}$$

where E is the mean (expected) value operator.

$x^s$ denote the pixel values in the square region surrounding the center pixel of the (two dimensional) edge.

$\mu$ is the mean of the values in the square region surrounding the center pixel of the (two dimensional) edge.

The lower the kurtosis the more pronounced the bimodality is [22-24]. This is particularly true [23,24] for a histogram composed of two peaks where the distribution about each mode is normal and closer to ±1 standard deviation from the mean (as appeared to be in our case). Consequently, higher values of the product of the variance and the inverse of the kurtosis, $$\frac{E\{(x_s - \mu)^2\}^3}{E\{(x_s - \mu)^4\}} \qquad \text{Eq. (2)}$$

indicate a better step-edge. The appropriate step-edge identified here will be used in the next stage.

A small size of the square region will have a better chance to be the image of a close to an ideal step-edge (because small step-edges are more likely to exist in a scene), but it should be large enough to include the whole significant part of the atmospheric blur (or blurring of any other single source or combination of sources).

In the absence of blur, at least four pixels (two bright and two darker) are needed for deriving the LSF from an ideal step-edge, while a degraded step-edge requires a larger amount of pixels. Thus, the size of the square region should be set to be larger than the maximum blur size assumed plus four. According to references [1,13,17], the atmospheric MTF extent for several kilometers imaging distance would be around $5 \times 10^3$ to $25 \times 10^3$ cycles/radian (depending mainly on the atmospheric conditions). In the real-blur example shown here later, for a 0.76×0.57 degrees camera field of view and 640×480 image pixels, the maximum atmospheric blur size would be approximately 10×10 pixels.

The 'Refinement of the Step-Edge' Stage:

The edge direction relative to the image axes may optionally be calculated by the inverse tangent of the step-edge's vertical derivative divided by its horizontal derivative.

Then, the edge may optionally be rotated according to its angle to form a vertical (or horizontal) approximation of the step-edge, which is more convenient for further digital processing. Since the original step-edge may be non-perfect in real images (for instance, a non-perfect homogeneity), a further refinement is performed by picking up several appropriate step-edge vectors out of the whole set of vectors that construct the two-dimensional step-edge. This is done by matching each vector with an ideal step-edge vector. The vectors picked up are then averaged for noise reduction. Usually in low noise situations all of the selected step-edge vectors are extremely similar, in which case this operation would be not significant.

The 'Calculation of the Atmospheric Mtf and Image Restoration' Stage:

An estimated edge spread function (ESF) is then the monotonic gradient area in the average step-edge vector (disregarding the area beyond it). The derivative of the estimated ESF is the estimated LSF. Assuming isotropic atmospheric blurring statistics, the LSF is a good approximation of the atmospheric PSF (in any direction) whose Fourier transform magnitude is the MTF. The MTF is then used via a Wiener filtering to restore the atmospherically degraded image [1, 13, 17]. Accordingly, the restored image $\hat{f}(m,n)$ is the inverse Fourier transform, $\mathfrak{I}^{-1}$, of the multiplication of the Fourier transform of the degraded image, G(u,v), with the Wiener filter:

$$\hat{f}(m, n) = \mathcal{I}^{-1}[G(u, v)\text{Wiener}(u, v)], \qquad \text{Eq. (3)}$$

where $$\text{Wiener}(u, v) = \frac{1}{H(u, v)} \frac{|H(u, v)|^2}{|H(u, v)|^2 + \gamma}. \qquad \text{Eq. (4)}$$

In Eq. (4), u and v are the spatial frequency coordinates, H(u, v) is the MTF, and $\gamma$ is the ratio between the spectra of the noise and the original image. Usually this ratio is not known and $\gamma$ is assumed to be a constant proportional to the inverse of the SNR.

The efficiency of the method disclosed in the present patent application has been tested and proven both on simulated and on real atmospherically-degraded images. Two result examples (one of a simulated blur and one of a real blur) are presented below in the present patent application.

The purpose of the simulation was to enable a comparative evaluation of the results given the original image and the true MTF.

According to some embodiments of the present invention there is provided a system for automatic restoration of isotropic degradations of a digital image, the system including: (a) an image capture assembly; and (b) a processor, which is coupled to process automatically the digital image so as to derive a restoration of the digital image.

According to still further features in the described embodiments the processor includes: (i) a memory, wherein the memory includes software instructions, wherein the software instructions executing a preprogrammed logic algorithm include the stages of: receiving a blurred image; automatically finding proper step edge; calculating a PSF from the step edge; and restoring the blurred image.

According to still further features in the described embodiments the memory does not store previous knowledge about a PSF of a disturbance.

According to still further features in the described embodiments the algorithm includes no iterative stage.

According to still further features in the described embodiments the algorithm calculates the PSF from information that can be found in the image.

According to still further features in the described embodiments the system for automatic restoration of isotropic degradations of a digital image further includes: (c) an output assembly, wherein the output assembly can receive a restored image from the processor.

According to still further features in the described embodiments the image capture assembly is a CCD camera, or any device capable of forming a digital image.

According to still further features in the described embodiments the image capture assembly is an infrared camera.

According to still further features in the described embodiments the output assembly is a display screen.

According to some embodiments of the present invention there is provided a method for automatic restoration of isotropic degradations of a digital image. The method including the stages of: receiving a blurred image; automatically finding proper step edge; calculating a PSF from the step edge; and restoring the blurred image as a resorted image according to the PSF.

According to still further features in the described embodiments the method for automatic restoration of isotropic degradations of a digital image further includes the stage of: displaying the restored image.

According to still further features in the described embodiments the stage of automatically finding a proper step edge includes; finding edges in the blurred image; erasing edge pixels having more than two neighbors; recognizing an angle among neighbors of each edge pixel; finding straight and long edges according to the angles; finding edge pixels with homogeneous areas from both of their sides and with high contrast; and selecting the most appropriate edge.

According to still further features in the described embodiments the stage of calculating the PSF from the step edge includes: selecting a few vectors of the 2-D (two dimensional) edge; constructing ESF; and using the vectors for calculating a LSF and PSF.

According to some embodiments of the present invention there is provided a method for automatic restoration of isotropic degradations of a digital image, the method including: receiving a blurred image; finding edges in the blurred image, the edges having a plurality of edge pixels; erasing edge pixels having more than two neighbors; recognizing an angle among neighbors of each edge pixel; finding straight and long edges according to the angles; finding edges with homogeneous areas from both of their sides and with high contrast; selecting the most appropriate edge; selecting a few vectors of 2-D edge; constructing an ESF; using the vectors for calculating a LSF; restoring the blurred image as a resorted image; and displaying the restored image.

Additional objects and advantages of the invention will be set forth in part in the description which follows and, in part, will be obvious from the description, or may be learned by practice of the invention.

BRIEF DESCRIPTION OF THE DRAWINGS

The invention is herein described, by way of example only, with reference to the accompanying drawings, wherein:

FIG. 17a presents the pixel which obtained the highest value, after performing an evaluation of the contrast and bi-modality of histograms of square regions surrounding each edge pixel (which belongs to a long straight line).

FIG. 17b presents the pixel that obtained the highest value as shown in the previous illustration, which comprises the center of the appropriate step edge region, which is shown here, enlarged.

FIG. 17c presents the step-edge after selecting of the appropriate 10 edge vectors out of the 25 vectors of the selected two-dimensional step-edge and rotating toward a vertical edge direction, so that the line separating "white" and "black" will be vertical relative to the frame.

FIG. 17d presents the corresponding estimated ESF.

FIG. 18a shows a comparison between the estimated MTF, the true MTF that was used to blur the original image, and the MTF extracted from the restored image.

FIG. 18b shows the resulting Wiener-filtered restored image after using the estimated MTF.

DETAILED DESCRIPTION OF EMBODIMENTS

Figure 1:
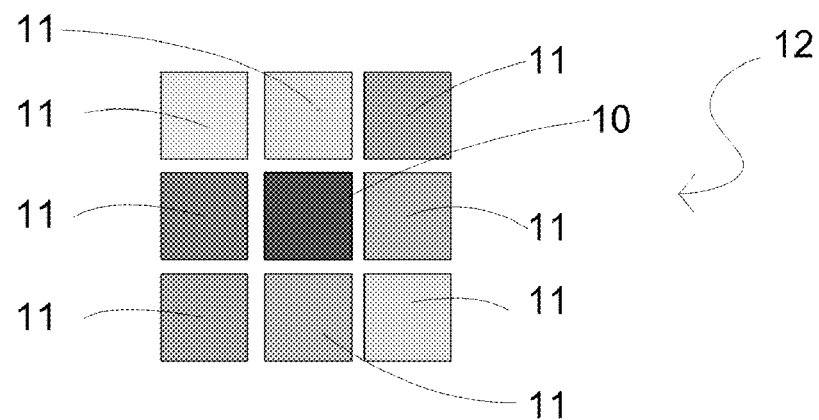
FIG. 1 is a schematic top view of a matrix of nine pixels.

The present invention is a system and efficient method for estimating the atmospheric PSF from the degraded image itself, under the assumption of a linear space-invariant degradation process and isotropic statistical properties of the blur. The method, according to the present invention, is based on deriving the PSF automatically from the appropriate (closest to ideal) step-edge in the degraded image. Because step-edges exist in many images, this technique can often be used. The algorithm was applied to both simulated and real atmospherically degraded images. Restoration results, using the estimated PSF, show significantly improved images. This method can be applied to any isotropic blur such as out of focus and diffraction. A generalization of this approach can be performed for non isotropic blur where step edges exist in the image in different orientations.

The principles and operation of a system and a method for automatic restoration of isotropic degradations of a digital image according to the present invention may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawings.

Unless otherwise defined, all technical and scientific terms used herein have the same meaning as commonly understood by one of ordinary skill in the art to which this invention belongs. The materials, dimensions, methods, and examples provided herein are illustrative only and are not intended to be limiting.

The symbols used in the formulae in this patent application signify terms as shown in the following list:

E—the mean value operator $x_s$—the pixel values in a square region surrounding the center pixel of the (two dimensional) edge $\mu$—the mean of the pixel values ($x_s$) in a square region surrounding the center pixel of the (two dimensional) edge u and v—spatial frequency coordinates (vertical and horizontal) in Fourier domain m and n—spatial coordinates (vertical and horizontal) in the image domain $\hat{f}(m,n)$—the restored image (after using Wiener filter)

$\mathfrak{J}^{-1}$—inverse Fourier transform operator $G(u,v)$—the Fourier transform of the degraded (blurred) image $\gamma$—a constant which is proportional to the inverse of the signal to noise ratio (SNR)

$H(u,v)$—the MTF f—original (unblurred) image $g_i$—the i'th blurred image (i=1, 2, 3 . . . )

$PSF_i$—the PSF that was used to create $g_i$ from f (via convolution)

Referring now to the drawings, FIG. 1 is a schematic top view of a matrix 12 of nine pixels. The eight external pixels 11 are defined in this case as pixel neighbors of the central pixel 10. Its size, namely the number of the pixel neighbors, can be defined as necessary according to the application.

Figures 2A, 2B, 2C, 2D:
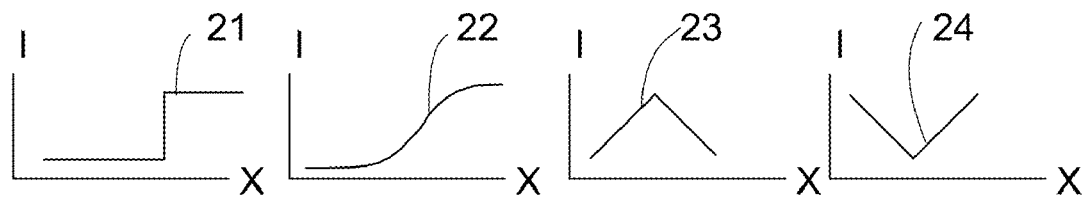
FIG. 2a is a graphical description of the edge type of sharp step.
FIG. 2b is a graphical description of the edge type of gradual step.
FIG. 2c is a graphical description of the edge type of roof step.
FIG. 2d is a graphical description of the edge type of trough step.

FIG. 2a is a graphical description of gray levels of pixels along a line crossing a step. Axis I of the illustration shows gray levels, and axis X shows pixel location. This illustration shows sharp step 21.

FIG. 2b is a graphical description of the edge type of gradual step 22.

FIG. 2c is a graphical description of the edge type of roof step 23.

FIG. 2d is a graphical description of the edge type of trough step 24.

Figures 3A, 3B, 3C:
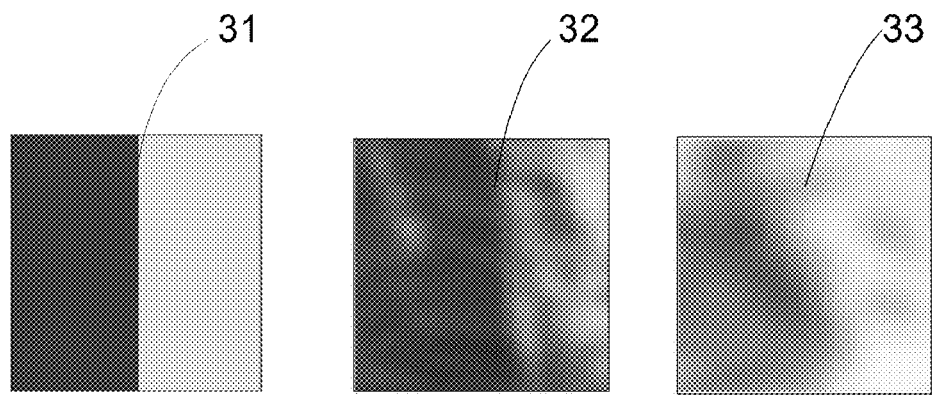
FIG. 3a presents an original image of an ideal step edge 31.
FIG. 3b presents an original image of a non-ideal step edge 32.
FIG. 3c presents an original image of a non-ideal type step 33.

FIG. 3a presents an original image of an ideal step edge 31.

FIG. 3b presents an original image of a non-ideal step edge 32.

FIG. 3c presents an original image of a non edge type step 33.

Figure 4A:
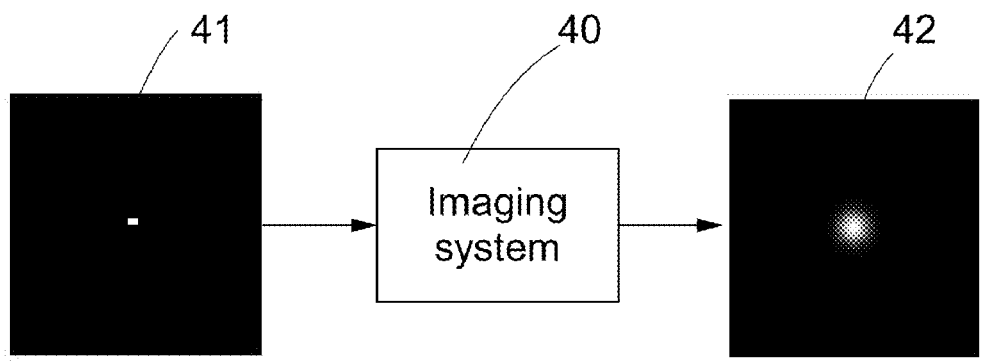
FIG. 4a presents a point spread function (PSF), showing a response of an imaging system to photography of a point source.

FIG. 4a presents a point spread function (PSF) 42, showing the response of imaging system 40 to photography of a point source 41. As the PSF widens, the blur increases. The imaging system 40 includes all of the factors affecting the transport of radiation from the object plane to the image plane. Therefore, the PSF includes the effect of atmosphere, the optical system, and additional factors, if present, such as movement of the camera during photography.

Figure 4B:
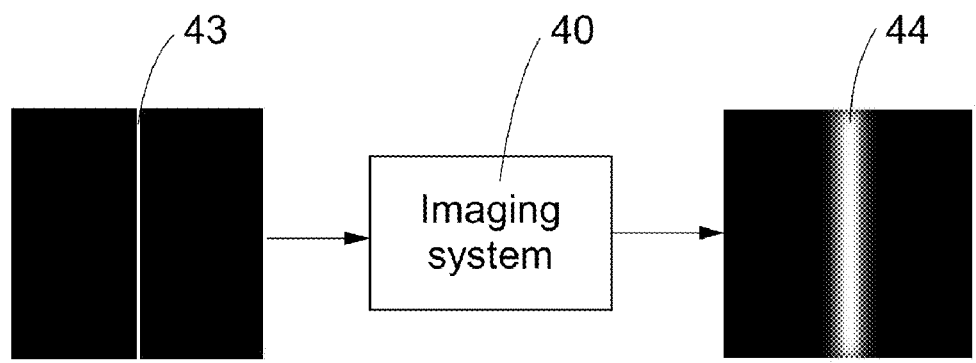
FIG. 4b presents a one-dimensional line spread function (LSF), describing the response of the imaging system to photography of a line.

FIG. 4b presents a one-dimensional line spread function (LSF) 44, describing the response of the imaging system 40 to photography of a line 43. As the LSF widens, the blur increases.

Figure 4C:
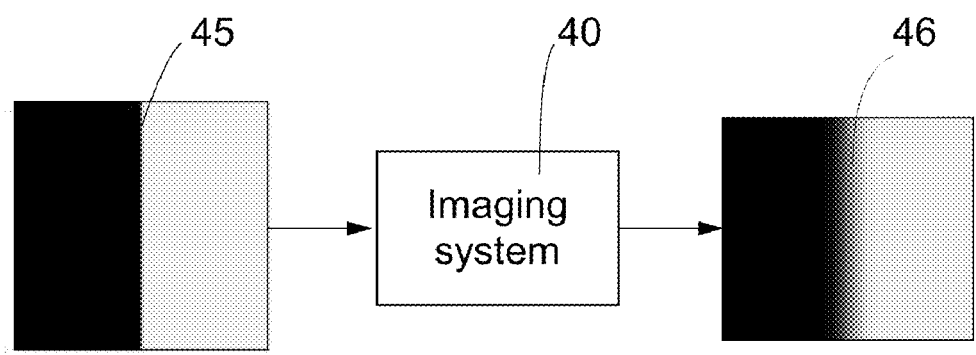
FIG. 4c presents an edge spread function (ESF), describing the response of the imaging system to photography of a step type edge.

FIG. 4c presents a edge spread function (ESF) 46, describing the response of the imaging system 40 to photography of a step type edge 45. As the ESF widens, the blur increases.

Note that the derivative of the ESF is equivalent to the LSF.

$$d/dx\, ESF(x) = LSF(x) \qquad \text{Eq. (5)}$$

Figure 5:
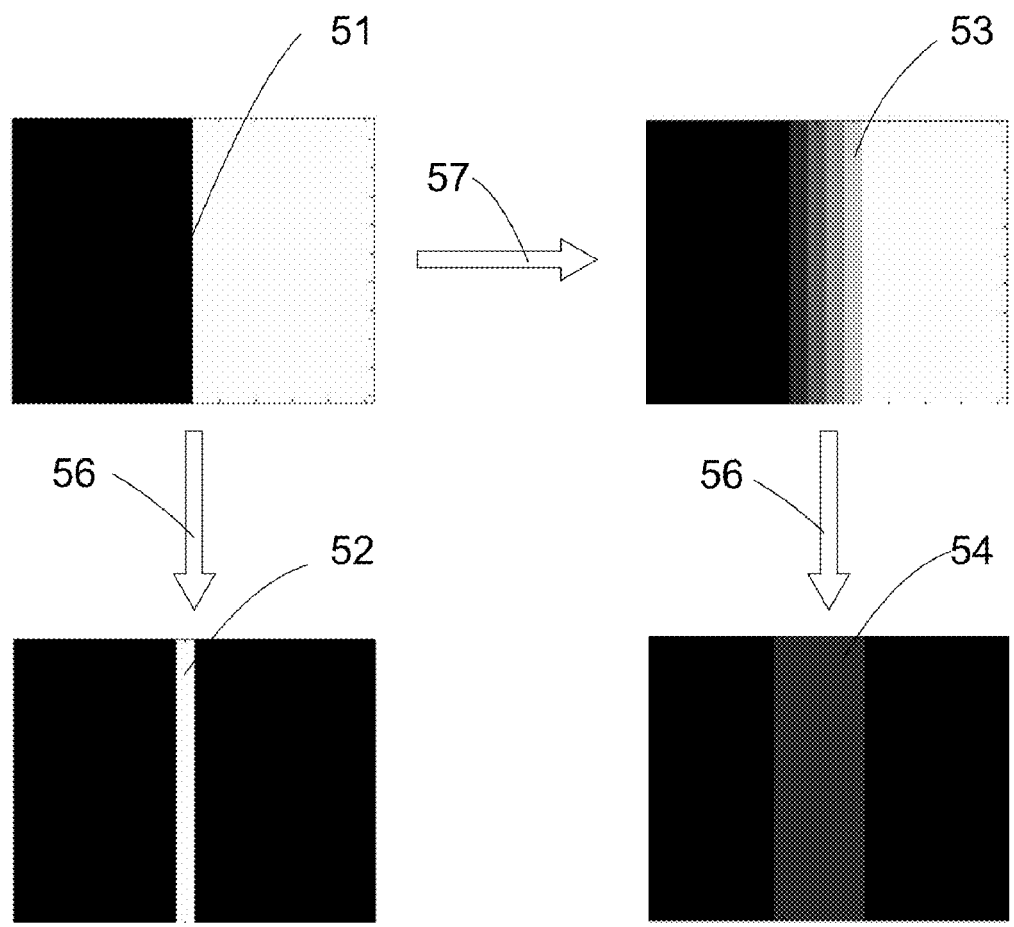
FIG. 5 presents a process of extracting the LSF from a step type edge.

FIG. 5 presents a process of extracting the LSF from a step type edge. In the case derivation 56 is performed on an ideal step edge image 51, a sharp image 52 is received. In the case that derivation 56 is performed on an image received after performing acquisition 57 of the ideal step edge image 51, which is an image with a blurred step edge 53, an non-sharp image 54 is received.

Figure 6A:
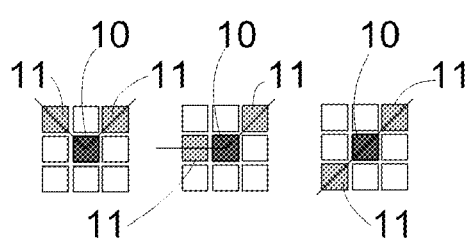
FIG. 6a is a schematic top view of three matrices, with a central pixel in the center of each, serving as an evaluated pixel.

FIG. 6a is a schematic top view of three matrices, each of nine pixels, with a central pixel 10 in the center of each, serving as an evaluated pixel, as well as two neighbor pixels 11. Each of these pixel trios defines an angle, such that the trios of the left matrix defines an angle of 90 degrees, the trios of the central matrix defines an angle of 135 degrees, and the trios of the right matrix defines an angle of 180 degrees.

Figure 6B:
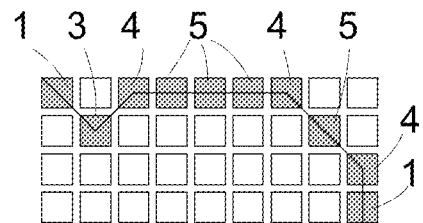
FIG. 6b is a schematic top view of a matrix serving as an example for consideration of the local (straightness) weight of each pixel in the contours, which is also related to the number of its neighbors, according to a method of the present invention.

FIG. 6b is a schematic top view of a matrix with four rows and nine columns of pixels, indicating ten pixels defined as a chain. This description serves as an example for consideration of the local (straightness) weight of each pixel in the contours, which is also related to the number of its neighbors, according to the method of the present invention as described in the summary of the invention.

Edge pixels with two neighbors receive a higher weight than with one or zero neighbors. Closed-loop edge chains are treated as periodic chains, thus all pixels have two adjacent neighbors. Accordingly, pixels with only one or zero neighbors are assigned the value 1, while pixels with two neighbors and angles of 45, 90, 135 and 180 are assigned the values 2, 3, 4 and 5, respectively. These values are shown in this illustration.

Note that other weights can be defined for pixels according to other preferences of neighbors and angles.

An example for such a small-scale length and straightness weighting code is shown in Table 1, for the chain of pixels (edge pixels), respectively with the example chain of the present illustration, with the pixels numbered in the table according to the chain pixels, with pixel number 1 being the leftmost pixel, and continuous numbering along the chain.

TABLE 1

| | Pixel number | | | | | | | | | |
|---|---|---|---|---|---|---|---|---|---|---|
| | 1 | 2 | 3 | 4 | 5 | 6 | 7 | 8 | 9 | 10 |
| Angle (degree) | — | 90 | 135 | 180 | 180 | 180 | 135 | 180 | 135 | — |
| Weighting code | 1 | 3 | 4 | 5 | 5 | 5 | 4 | 5 | 4 | 1 |

Table 1A weighting code of small-scale length and straightness evaluation of the edge pixels shown in FIG. 6b.

Figure 7A:
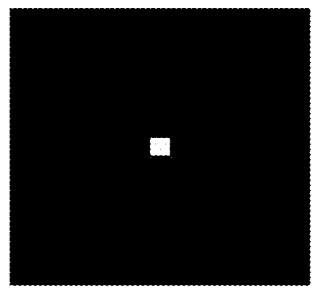
FIG. 7a presents a first case of PSF which by nature causes the least effect on the blur as a result of atmospheric degradation.

FIG. 7a presents a PSF as a first case in the series of PSF's shown in the following illustrations. The PSF includes a matrix of pixels in a window of a specific size, with each pixel having a specific gray level. The PSF causes image blurring according to its qualities, starting with blurring that can be undetected by the viewing eye, through various levels of blurring, to severe blurring that renders the characters in the image indistinguishable. In space-invariant systems where the PSF is similar at all locations the PSF affects the blurring according to the following equation:

$$g_i(x,y) = f(x,y) \otimes PSF_i(x,y) \quad i=1, 2, 3 \ldots \qquad \text{Eq. (6)}$$

where f(m, n) is the original image.
$g_i(m, n)$ is the i'th blurred image.
$PSF_i(x, y)$ is one of the PSF's presented in this series of illustrations.
⊗ marks the convolution operator The PSF in the present illustration is the case with the least effect on the blur as a result of atmospheric degradation.

Figure 7B:
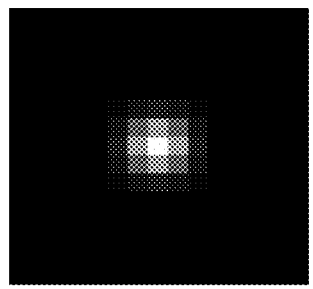
FIG. 7b presents a second case of PSF which by nature causes a larger blur of the image than that of the previous illustration.

FIG. 7b presents a second case of PSF which by nature causes a larger blur of the image than that of the previous illustration.

Figure 7C:
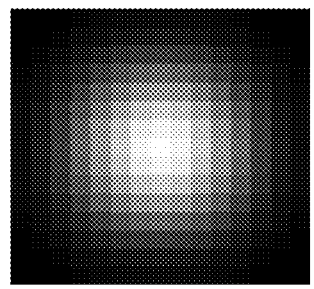
FIG. 7c presents a third case of PSF which by nature causes an even larger blur of the image than that of the previous illustration.

FIG. 7c presents a third case of PSF which by nature causes an even larger blur of the image than that of the previous illustration.

Figure 7D:
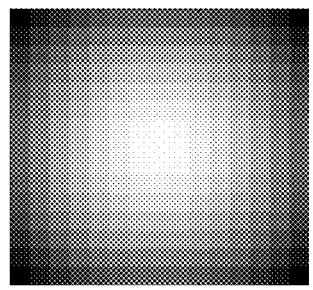
FIG. 7d presents a fourth case of PSF which by nature causes severe blurring.

FIG. 7d presents a fourth case of PSF which by nature causes severe blurring.

Figure 7E:
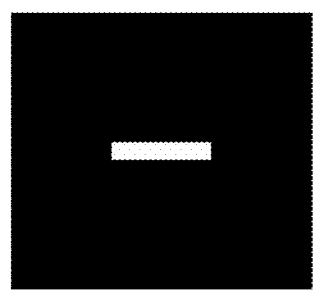
FIG. 7e presents a PSF typical for a case of motion on the horizontal plane, relative to the camera.

FIG. 7e presents a PSF typical for a case of motion on the horizontal plane, relative to the camera (motion that can be created, for example, by linear or rotational movement of the camera, or by movement of the photographed figure).

Figure 7F:
FIG. 7f presents a PSF typical for a case of motion on the perpendicular plane, relative to the camera.

FIG. 7f presents a PSF typical for a case of motion on the perpendicular plane, relative to the camera. The present illustration shows blurring as a result of motion at a higher speed than that of the previous illustration.

Figure 8:
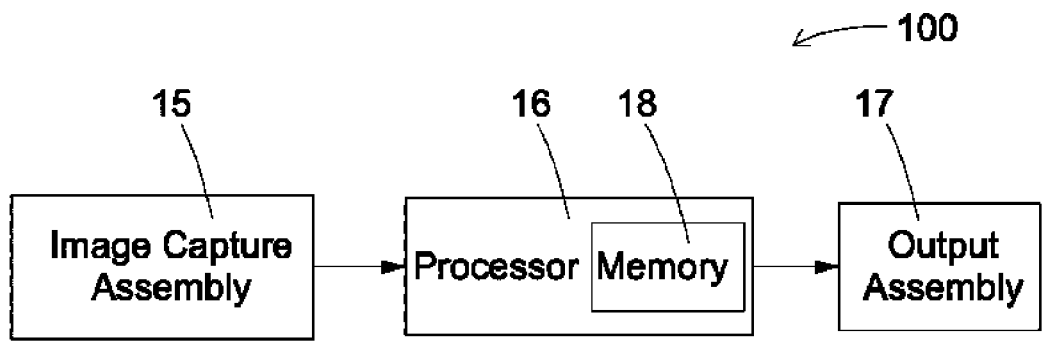
FIG. 8 is a block diagram of a system for blind restoration of image degraded by isotropic blur, according to the present invention.

FIG. 8 is a block diagram of a system 100 for blind restoration of image degraded by isotropic blur, according to the present invention. The system includes an image capture assembly 15, which can be a camera or any other means of acquiring an image, serving for acquiring an original image which has been degraded by isotropic blur, and a processor 16 which is a digital signal processing unit, also including a memory 18, which includes software instructions, for executing a preprogrammed logic algorithm, which includes stages of a method according to the present invention.

Processor 16 obtains a blurred image from the image capture assembly 15 and performs automatic finding of the blur function, such as the PSF or the MTF, according to the image, and then performs image restoration (based on the extracted blur function).

The system can also include output assembly 17 which can be a screen or any other means, and can received a restored image from the processor 16 for display or additional processing, such as for the purpose of video image display.

Output assembly 17 may optionally be a computer display, a printer, or a display (in general). Output assembly 17 can transmit the results to another computer.

Figure 9A:
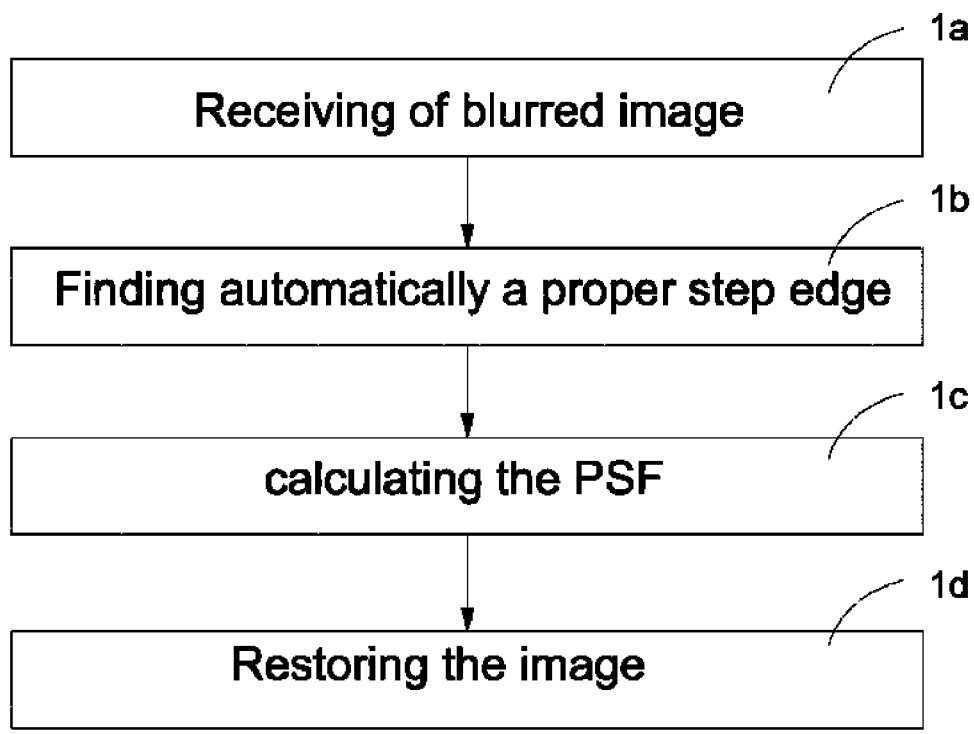
FIG. 9a is a flow chart of the main stages of blind restoration of image degraded by isotropic blur, according to a method of the present invention.

FIG. 9a is a flow chart of the main stages of blind restoration of image degraded by isotropic blur, according to the method of the present invention.

The method includes four main stages, which are: receiving a blurred image stage 1a, automatically finding a proper step edge 1b (as close as possible to ideal), in the image, calculating the PSF from the step edge 1c, and restoring image 1d, using a restoration filter.

Figure 9B:
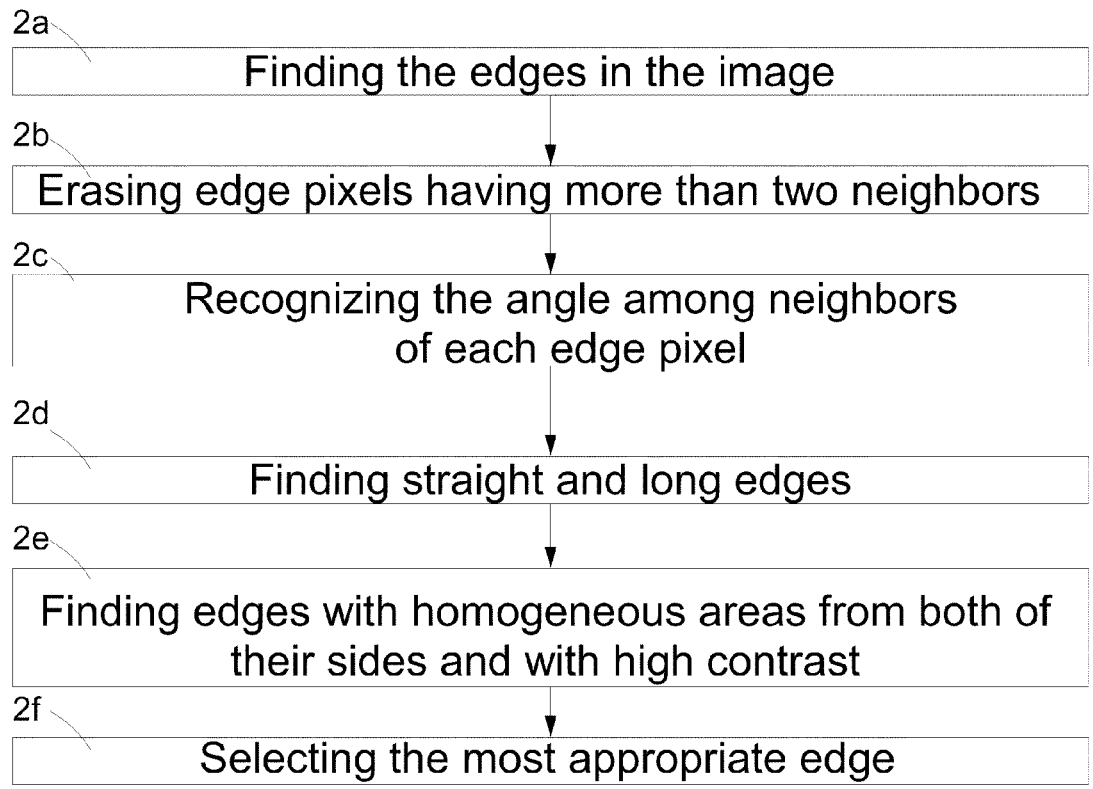
FIG. 9b is a flow chart of sub-stages of the stage of automatically finding the proper step edge.

FIG. 9b is a flow chart of sub-stages of the stage of automatically finding the proper step edge 2, which are: the sub-stage of finding edges in the image 2a, the sub-stage of erasing edge pixels having more than two neighbors 2b, the sub-stage of recognizing the angle among the neighbors of each edge pixel 2c, the sub-stage of finding straight and long edges according to the angles 2d, (a flat angle meaning more straightness), the sub-stage of finding edges which are homogeneous on both sides, and with high contrast 2e, and the sub-stage of selecting the most appropriate edge 2f, (as close as possible to ideal step edge).

Figure 9C:
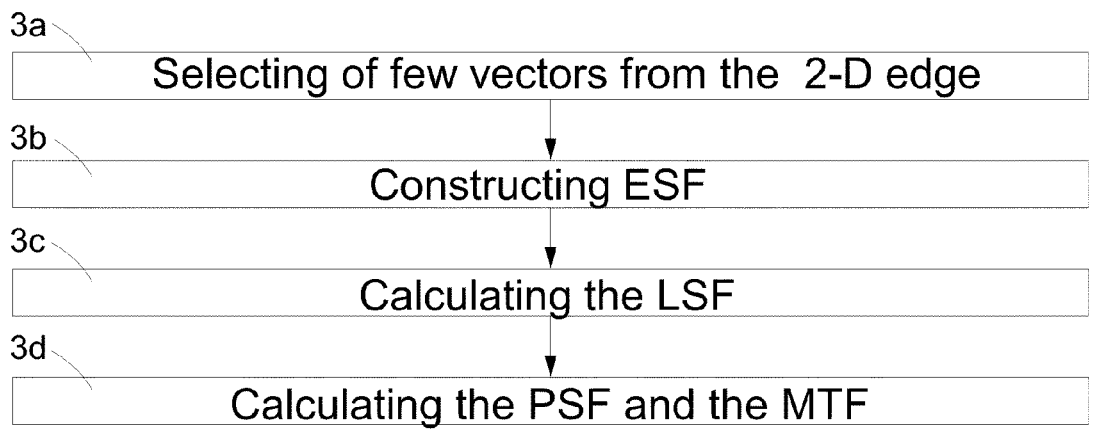
FIG. 9c is a flow chart of sub-stages of the stage of calculating the PSF (or MTF) from the step edge.

FIG. 9c is a flow chart of sub-stages of the calculating the PSF from the step edge stage 3, which are: the sub-stage of selecting a few vectors from the 2-D edge 3a, the sub-stage of constructing ESF (edge spread function) 3b, using the vectors from the previous stage, the sub-stage of calculating the LSF 3c, by calculating the ESF derivative, and the sub-stage of calculating the PSF and the MTF 3d.

Figure 10:
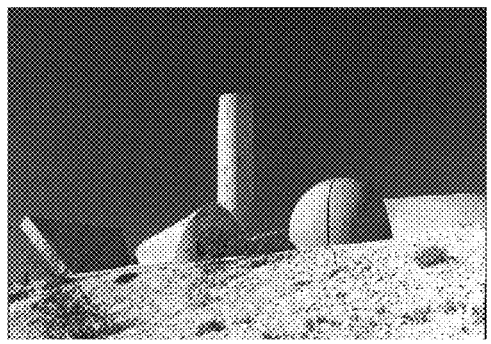
FIG. 10 presents an original image, which serves for examining and demonstrating the method described in the present patent application.

FIG. 10 presents an original image containing 895×604 pixels, which served for examining and demonstrating the method described in the present patent application.

Figure 11:
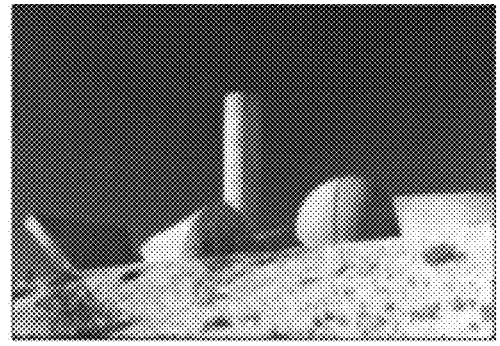
FIG. 11 presents a synthetically blurred version of the image of FIG. 10.

FIG. 11 presents a synthetically blurred version of the image of FIG. 10, obtained by convolving it with a Gaussian function which approximates an atmospheric blur [8-10]. The Gaussian support size was 21×21 pixels and its standard deviation was set to 3.

Figure 12:
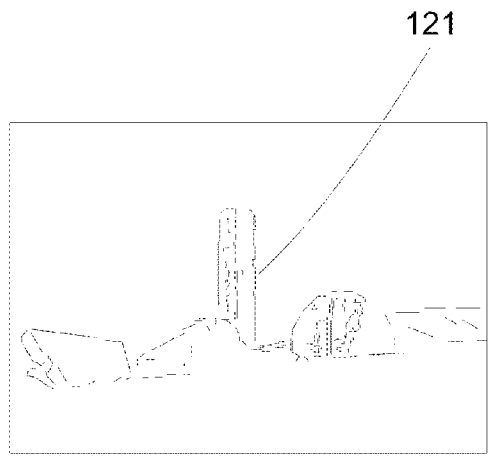
FIG. 12 is a schematic illustration of the contours of the image of FIG. 11 after the activation of a canny edge detector.

FIG. 12 is a schematic illustration of the contours of the image of FIG. 11 after the activation of a canny edge detector. The detected edge pixels were separated into chains one of which is marked with the number 121.

For practical reasons the illustration does not show all of the chains, but only some of them.

Figure 13:
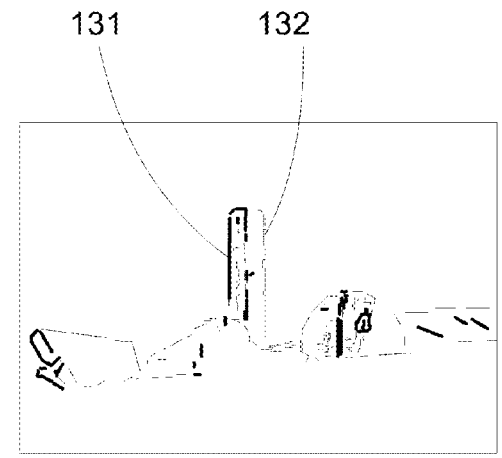
FIG. 13 describes separate groups of sequentially connected pixels in the contours of the image of FIG. 12.

FIG. 13 describes separate groups of sequentially connected pixels in the contours of the image of FIG. 12.

Also for practical reasons, the present illustration does not show all of the chains, but only some of them, and not all of the groups but only two of them, with the chains of one group shown as a thick line, one of which is marked with the number 131, and the other group shown as a thinner line, one chain of which is marked with the number 132.

Figure 14:
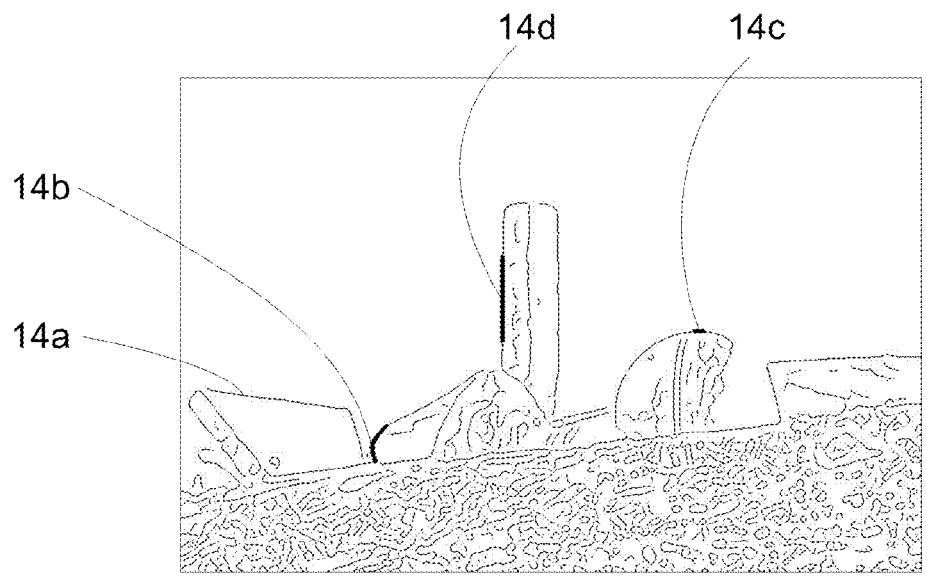
FIG. 14 describes a schematic illustration of the length and straightness of the edge pixels of the image of FIG. 11.

FIG. 14 is a schematic illustration of the length and straightness of the edge pixels of the image of FIG. 11. In this illustration the thin black lines 14a denote edge pixels, while the thicker black lines denote examples of non-straight edge pixels 14b, a short chain of straight edge pixels 14c, and a long chain of straight edge pixels 14d. The non-straight edge pixels 14b demonstrate the case in which a chain of connected edge pixels does not form a straight line, and therefore gets a lower score in the length and straightness evaluation process, the short chain of straight edge pixels 14c demonstrate the case in which a chain of connected edge pixels has a short length, and therefore gets a lower score in the length and straightness evaluation process, and the long chain of straight edge pixels 14d demonstrates the case in which a chain of connected edge pixels is long and straight, and therefore gets a higher score in the length and straightness evaluation process.

The short chains of straight edge pixels 14c are detected using small scale evaluation taking into account the weighting code of each pixel, according to the length and straightness of the edge pixels as were evaluated, while the long chains of straight edge pixels are detected using the large-scale evaluation stage, taking into account the weighting code of each pixel, according to the length and straightness of the edge pixels as were evaluated. These larger scale length and straightness weights were evaluated by low-pass filtering the small scale scores (code) with a rectangular convolution kernel whose width was 25 pixels.

Figure 15:
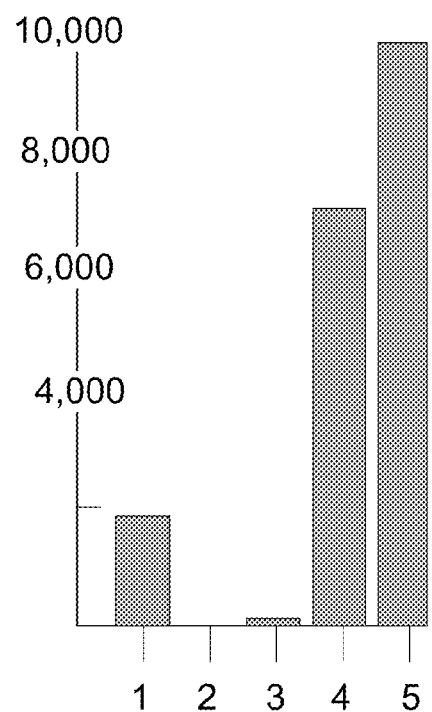
FIG. 15 presents a histogram of the small scale straightness weighting code.

FIG. 15 presents a histogram of the small scale straightness weighting code (score). The bottom of the histogram shows the five possible straightness weighting codes (according to the present invention, any other number of possible choices can be selected). The left side of the histogram shows pixel quantity values of each value of the straightness weighting code.

It can be seen that most of the detected edge-pixels (around 10,000 pixels) were assigned the highest possible value.

Figure 16:
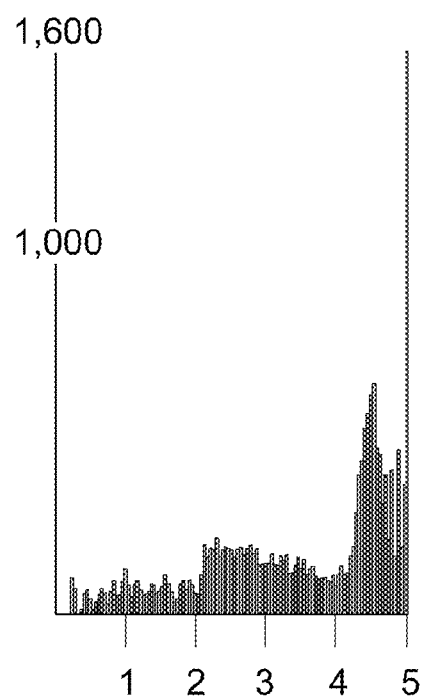
FIG. 16 presents a histogram of the large scale straightness weighting code.

FIG. 16 presents a histogram of the large scale straightness weighting code (score). The histogram shows that after this stage only 1,525 pixels were left (around 0.3% of the initial number of 895×604 pixels), seeing as only these 1,525 pixels were given the straightness weighting code value 5.

FIG. 17a presents the pixel 71, which is marked, enlarged, by a white circle with a black rectangle in its center, which obtained the highest value, after performing an evaluation of the contrast and bi-modality of the histograms of 25×25 square regions surrounding each of those 1,525 pixels, according to Eq. (2). The numerical values at the bottom and the left side of the illustration represent the pixels of the full image.

FIG. 17b presents the pixel that obtained the highest value as shown in the previous illustration, which comprises the center of the appropriate step edge region, which is shown here, enlarged. Results were hardly affected by changes of the square region size between 15×15 and 65×65 pixels. The numerical values at the bottom and left side of the illustration represent the pixels of the square region.

The edge obtained is composed of a certain number of rows and columns. In order to find the ESF, selecting a single row is enough, however it is better to select several rows and average them (to reduce noise). The selection of rows to be averaged was done as follows: defining an ideal step function, correlation, and selection of vectors (rows) in which the correlation was highest.

This selection may improve the algorithm performances in the case where no ideal step-edge exists in the original (non-blurred) image.

FIG. 17c presents the step-edge after selection of the appropriate 10 edge vectors out of the 25 vectors of the selected two-dimensional step-edge and rotation toward a vertical edge direction so that the line separating "white" from "black" is vertical relative to the frame.

The numerical values at the bottom and left side of the illustration represent the pixels.

FIG. 17d presents an averaging of all the vectors (rows) selected in the previous stage (ESF). The derivative of the ESF is the LSF. Due to isotropicity, the LSF is also a one-dimensional section of the PSF in every direction. The MTF is the Fourier Transform magnitude of the PSF. The numerical values at the bottom and left side of the illustration represent pixels and pixel values (gray-levels), respectively.

FIG. 18a shows a comparison between the estimated MTF 182 and the true MTF 183 that was used to blur the original image (presented in FIG. 10). The illustration also shows the MTF 181, calculated from the restored image, from the same edge used to calculate the MTF in the blurred image. The estimated MTF 182 was then used to restore the blurred image.

FIG. 18b shows the resulting Wiener-filtered restored image (with $\gamma=0.00001$ in Eq. (4)) after using the estimated MTF. It is clear that this image is considerably better than the blurred image shown in FIG. 11, and very similar to the original (ground-truth) image shown in FIG. 10. The ratio between the areas under the MTF curves (MTFA) after and before restoration is 2.31, where the MTF curve of the restored image was estimated from the same step-edge region that was used for the estimation of the MTF from the blurred image.

Figure 19A:
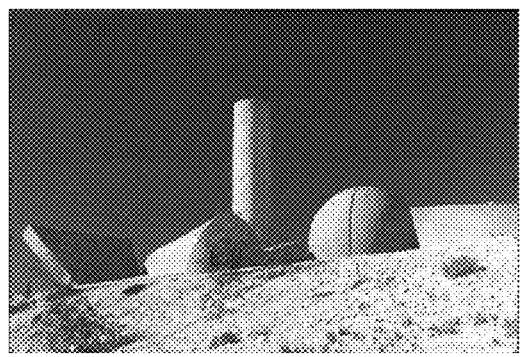
FIG. 19a shows the resulting of implementation of the common Richardson-Lucy (RL) blind-deconvolution on the image of FIG. 11.

FIG. 19a shows the resulting of implementation of the common Richardson-Lucy (RL) blind-deconvolution method [27,28] using a built-in MATLAB function "deconvblind", after 300 iterations with initial Gaussian PSF of standard deviation of 3 (the Gaussian support size was set to 25×25 pixels in both cases). This method employs an iterative procedure to estimates the PSF, and therefore requires an initial guess of it.

This was done for the purpose of comparison between the Richardson-Lucy (RL) blind-deconvolution method and the method according to the present invention.

Figure 19B:
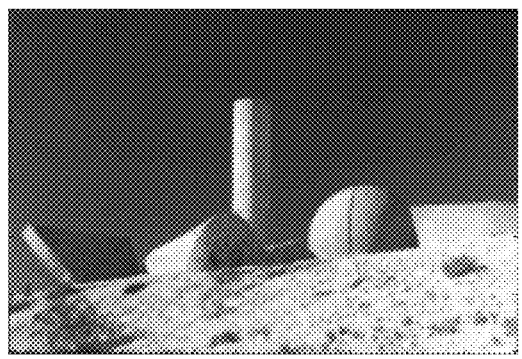
FIG. 19b shows the resulting of a similar implementation as described in the previous illustration, however with another initial Gaussian PSF.

FIG. 19b shows the resulting of a similar implementation as described in the previous illustration, however with initial Gaussian PSF of standard deviation of 2.

It can be seen that the restored image shown in FIG. 19a is significantly better than the restored image shown in FIG. 19b and actually quite similar to the restored image shown in FIG. 18b. This demonstrates the high sensitivity of the RL method to the initial guess of the PSF. On the contrary, the method according to the present invention, is not iterative, and does not require initial guess of the PSF. It does require a selection of an appropriate square region size, but it is significantly not very sensitive to this parameter. Indeed, the quality of the restored image shown in FIG. 18b was hardly affected by changes of the square region size between 15×5 and 65×65 pixels.

Therefore, the method according to the present invention may be used to produce a good initial PSF guess for a further refinement using the iterative method. However, experiments performed by the present inventors did not show any significant improvement when the RL method was employed for a further refinement. It should be noted that such iterative methods are considerably more computationally expensive than the proposed method.

Figure 20:
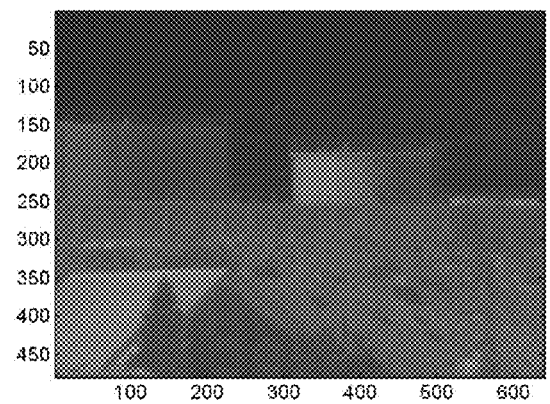
FIG. 20 presents a real-degraded image captured by a staring thermal camera.

FIG. 20 presents a real-degraded image captured by a staring thermal camera (FOX 720), in the 3-5 μm wavelength range, manufactured by CONTROP Ltd [26].

The image was taken in an urban area. The line of sight was horizontal, over a 3 kilometer path-length and an average elevation of 15 m above ground. The camera field of view was 0.76 degrees horizontal by 0.57 degrees vertical. The image contains 640×480 pixels, and its SNR is around 30 dB.

Figure 21:
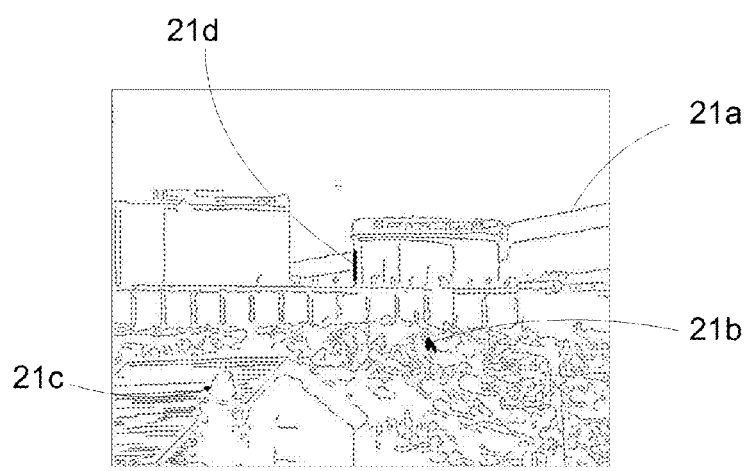
FIG. 21 describes a schematic illustration of the length and straightness of the edge pixels of the image of FIG. 20.

FIG. 21 is a schematic illustration of the length and straightness of the edge pixels of the image of FIG. 20. In this illustration the thin black lines 21a denote edge pixels, while the thicker black lines denote examples for a short chain of non-straight edge pixels 21b, short-straight edge pixels 21c, and a long chain of straight edge pixels 21d. The non-straight edge pixels 21b demonstrate the case in which a chain of connected edge pixels does not form a straight line, and therefore gets a lower score in the length and straightness evaluation process, the short-straight edge pixels 21c demonstrate the case in which a chain of connected edge pixels has a short length, and therefore gets a lower score in the length and straightness evaluation process, and the long chain of straight edge pixels 21d demonstrates the case in which a chain of connected edge pixels is long and straight, and therefore gets a higher score in the length and straightness evaluation process.

The short chains of straight edge pixels 21c are detected using small scale evaluation taking into account the weighting code of each pixel, according to the length and straightness of the edge pixels as were evaluated, while the long chains of straight edge pixels are detected using the large-scale evaluation stage, taking into account the weighting code of each pixel, according to the length and straightness of the edge pixels as were evaluated. These larger scale length and straightness weights were evaluated by low-pass filtering the small scale scores (code) with a rectangular convolution kernel whose width was 17 pixels.

Figure 22A:
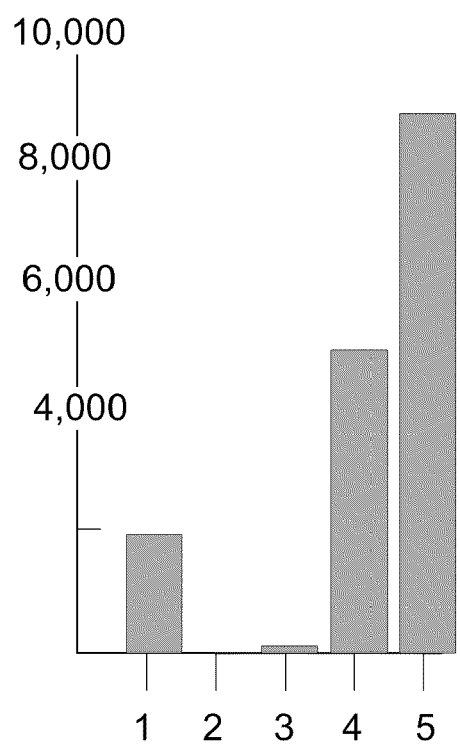
FIG. 22a presents a histogram of a small-scale straightness weighting code.

FIG. 22a presents a histogram of a small-scale straightness weighting code of the edge pixels.

Figure 22B:
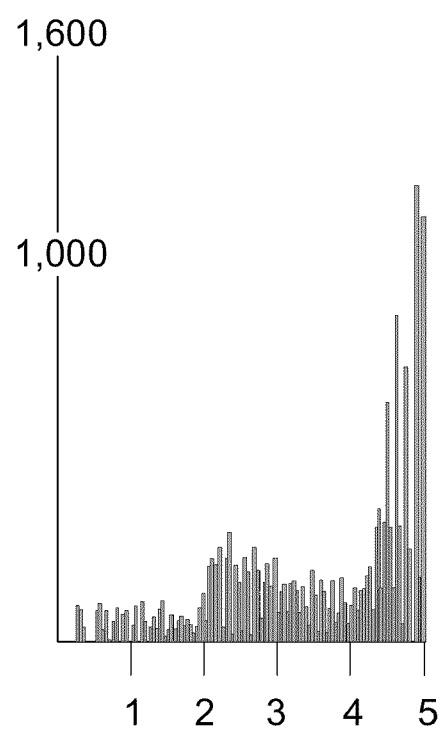
FIG. 22b presents a histogram of a large-scale straightness weighting code.

FIG. 22b presents a histogram of a large-scale straightness weighting code. The large scale scores were evaluated by low-pass filtering the small-scale weighting code with a rectangular convolution kernel of width 17 pixels. This resulted in only 1,070 pixels (around 0.35% of the initial number of 640×480 pixels) passing into the next stage of evaluating the contrast and bi-modality of the local-histograms (Eq. (2)) within square regions of size 17×17 pixels around each of the 1070 pixels.

Figure 23A:
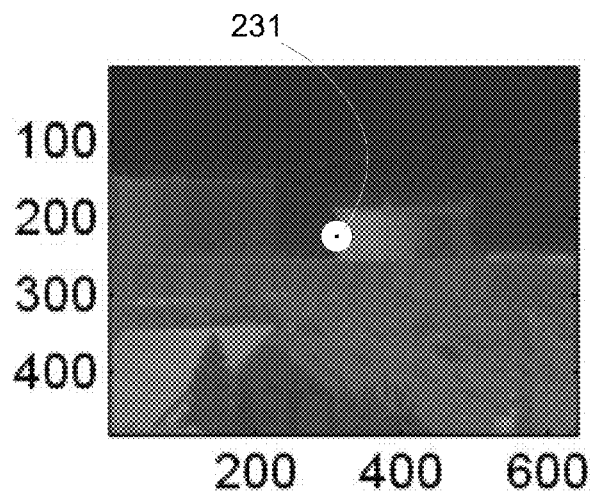
FIG. 23a presents a pixel as in FIG. 17a, but for the real-degraded image shown in FIG. 20.

FIG. 23a presents a pixel as shown in FIG. 17a, but for the real-degraded image shown in FIG. 20, the pixel 231, which is marked, enlarged, by a white circle with a black rectangle in its center. This pixel obtained the highest value, after performing an evaluation of the contrast and bi-modality of the histograms of 25×25 square regions surrounding each of the 1,070 pixels from the previous stage, according to Eq. (2). The image in which pixel 231 is displayed is an image recorded with a FLIR camera, which was taken from a range of about 3 km.

Figure 23B:
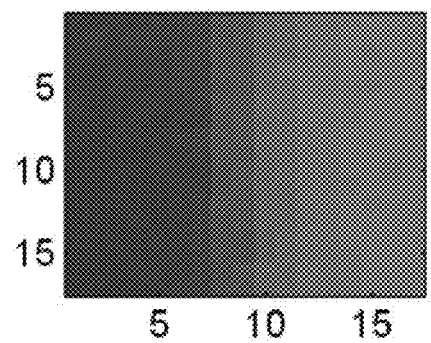
FIG. 23b presents the pixel that obtained the highest value (comprises the center of the appropriate step edge region) as shown in the previous illustration.

FIG. 23b presents the pixel that obtained the highest value as shown in the previous illustration, which comprises the center of the appropriate step edge region, which is shown here, enlarged.

Figure 23C:
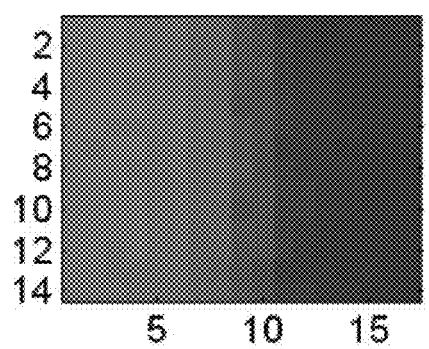
FIG. 23c presents the step-edge after selecting of the appropriate 14 edge vectors out of the 17 vectors of the selected two-dimensional step-edge and rotating toward a vertical edge direction so that the line separating "white" from "black" will be vertical relative to the frame

FIG. 23c presents the step-edge after selecting of the appropriate 14 edge vectors out of the 17 vectors of the selected two-dimensional step-edge and rotating toward a vertical edge direction so that the line separating "white" from "black" is vertical relative to the frame.

Figure 23D:
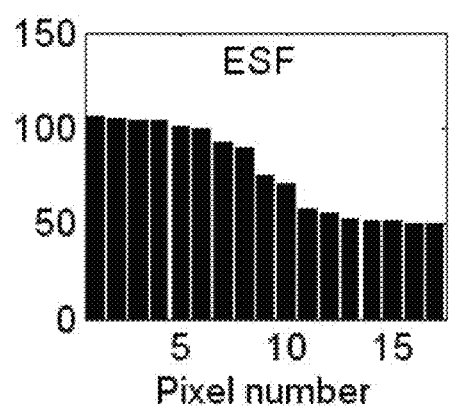
FIG. 23d presents the corresponding estimated ESF.

FIG. 23d presents the corresponding estimated ESF.

Figure 24A:
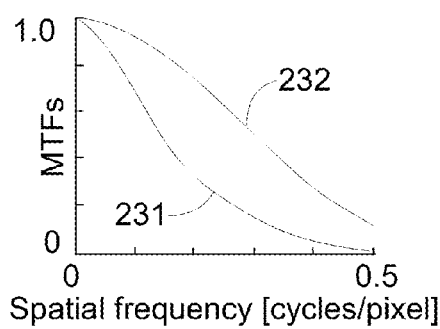
FIG. 24a shows a comparison between the MTF estimated from the blurred and restored images, respectively.

FIG. 24a shows a comparison between the estimated MTF 231 and the MTF extracted from the restored image 232 (from the same edge used to calculate the MTF in the blurred image). Results were hardly affected by changes of the square region size between 15×15 and 65×65 pixels.

Figure 24B:
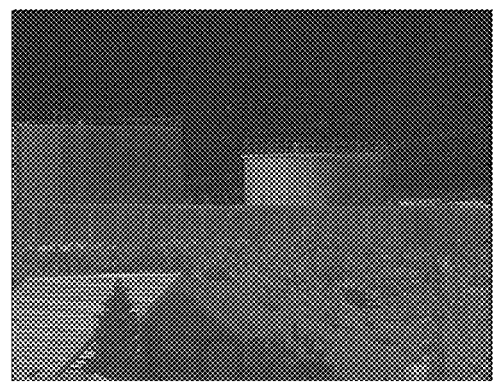
FIG. 24b shows the resulting Wiener-filtered restored image.

FIG. 24b shows the resulting Wiener-filtered restored image (with $\gamma=0.01/3$ in Eq. (4)). It is clear that the reconstructed image has considerably better resolution than the recorded image of FIG. 20. Indeed, the MTFA improvement ratio according to the MTF curves of FIG. 24a is 1.71, thus supporting the visual assessment provided here.

Figure 25A:
FIG. 25a shows the results of implementing the RL blind-deconvolution technique on the image of FIG. 20.

FIG. 25a shows the results of implementing the RL blind-deconvolution technique (after 20 iterations) with initial Gaussian PSF of standard deviation 2 (the Gaussian support size was set to 17×17 pixels in both cases).

This was done for the purpose of comparison between the Richardson-Lucy (RL) blind-deconvolution method and the method according to the present invention.

Figure 25B:
FIG. 25b shows the resulting of a similar implementation as shown in the previous illustration, however with another initial Gaussian PSF.

FIG. 25b shows the resulting of a similar implementation as shown in the previous illustration, however with initial Gaussian PSF of standard deviation 1.

It can be noted that the restored image shown in FIG. 25a is significantly better than the restored image shown in FIG. 25b, and actually quire similar to the restored image shown in FIG. 24b. This demonstrates again the high sensitivity of the RL method to the initial guess of the PSF, which needs to be considerably close to the true PSF. Conversely, in the method according to the present invention, a large range of square region sizes (such as between 13×13 and 53×53 pixels) hardly affected the high quality of the restored image shown in FIG. 24b.

While the invention has been described with respect to a limited number of embodiments, it will be appreciated that many variations, modifications and other applications of the invention may be made.

What is claimed is:

1. A system for automatic restoration of isotropic degradations of a digital image, the system comprising:
   (a) an image capture assembly; and
   (b) a processor, which is coupled to process automatically said digital image so as to derive a restoration of said digital image; wherein said processor includes:

(i) a memory, wherein said memory includes software instructions, wherein said software instructions executing a preprogrammed logic algorithm including the stages of:
  A. receiving a blurred image comprising a plurality of pixels;
  B. finding automatically a proper step edge by decomposing said pixels into a plurality of pixel chains, weighting said pixel chains according to straightness and homogeneity, and selecting a pixel chain as said step edge according to said weighting;
  C. calculating a PSF from the step edge; and
  D. restoring said blurred image.

2. The system of claim 1, wherein said memory does not store previous knowledge about a point spread function of a disturbance.

3. The system of claim 1, wherein said algorithm includes no iterative stage.

4. The system of claim 1, wherein said algorithm calculates said PSF from information that can be found in said image.

5. The system of claim 1 further comprising:
  (c) an output assembly, wherein said output assembly can receive a restored image from said processor.

6. The system of claim 1, wherein said image capture assembly is a digitizing equipment.

7. The system of claim 1, wherein said image capture assembly is a CCD camera.

8. The system of claim 1, wherein said image capture assembly is an infrared camera.

9. The system of claim 5, wherein said output assembly is a display screen.

10. A method for automatic restoration of isotropic degradations of a digital image, the method comprising the stages of:
  receiving a blurred image;
  automatically finding a proper step edge;
  wherein said stage of automatically finding said proper step edge includes:
    finding edges in said blurred image;
    erasing edge pixels having more than two neighbors;
    recognizing an angle among neighbors of each edge pixel;
    finding straight and long edges according to said angles;
    finding edge pixels with homogenous areas in both sides of the said edges, and with high contrast; and
    selecting the most appropriate edge:
  calculating a PSF from the step edge; and
  restoring said blurred image as a resorted image according to said PSF.

11. The method for automatic restoration of isotropic degradations of a digital image of claim 10 further comprising the stage of:
  displaying said restored image.

12. The method of claim 10 wherein said stage of calculating the PSF from the step edge includes;
  selecting a few vectors of the 2-D edge;
  constructing ESF; and
  using said vectors for calculating a LSF.

13. A method for automatic restoration of isotropic degradations of a digital image, the method comprising:
  receiving a blurred image;
  finding edges in said blurred image, said edges having a plurality of edge pixels;
  erasing edge pixels having more than two neighbors;
  recognizing an angle among neighbors of each edge pixel;
  finding straight and long edges according to said angles;
  finding edge pixels with homogenous areas in both sides of the said edges, and with high contrast;
  selecting the most appropriate edge as a selected step edge;
  selecting a few vectors of said selected step edge;
  constructing an ESF;
  using said vectors for calculating a LSF;
  restoring said blurred image as a resorted image; and
  displaying said restored image.

* * * * *